US008694500B2

United States Patent
Yao et al.

(10) Patent No.: US 8,694,500 B2
(45) Date of Patent: *Apr. 8, 2014

(54) METHOD AND APPARATUS FOR DOCUMENT MATCHING

(71) Applicant: Rockstar Consortium US LP, New York, NY (US)

(72) Inventors: Zhonghui Yao, Kanata (CA); Kent Felske, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,544

(22) Filed: Oct. 30, 2012

(65) Prior Publication Data

US 2013/0054643 A1 Feb. 28, 2013

Related U.S. Application Data

(63) Continuation of application No. 11/410,748, filed on Apr. 25, 2006, now Pat. No. 8,312,016.

(51) Int. Cl.
*G06F 17/30* (2006.01)

(52) U.S. Cl.
CPC ..................................... *G06F 17/30* (2013.01)
USPC ........... 707/736; 707/755; 707/756; 707/793; 707/796

(58) Field of Classification Search
None
See application file for complete search history.

(56) References Cited

U.S. PATENT DOCUMENTS

2005/0114314 A1* 5/2005 Fan et al. .......................... 707/3

* cited by examiner

*Primary Examiner* — Anh Tai Tran
(74) *Attorney, Agent, or Firm* — Anderson Gorecki & Rouille LLP

(57) ABSTRACT

Documents written using a markup language such as XML may be decomposed into Path and Parent Associated Node (PPAN) elements, each of which is a linear data structure that includes the content of a node, the parent-child relationship of the node, and the path level of the node. A number of PPAN elements may be grouped together to form A PPAN chain. A PPAN matching process uses the PPAN elements/PPAN chain to search for structured documents that match the PPAN chain. The PPAN matching process is able to perform query and match at the same time to accelerate the PPAN matching process, and also enables complex services to be represented by generic structured documents. Optionally, the PPAN matching process may support wildcard requests so that services may be discovered without prior knowledge of the services.

18 Claims, 8 Drawing Sheets

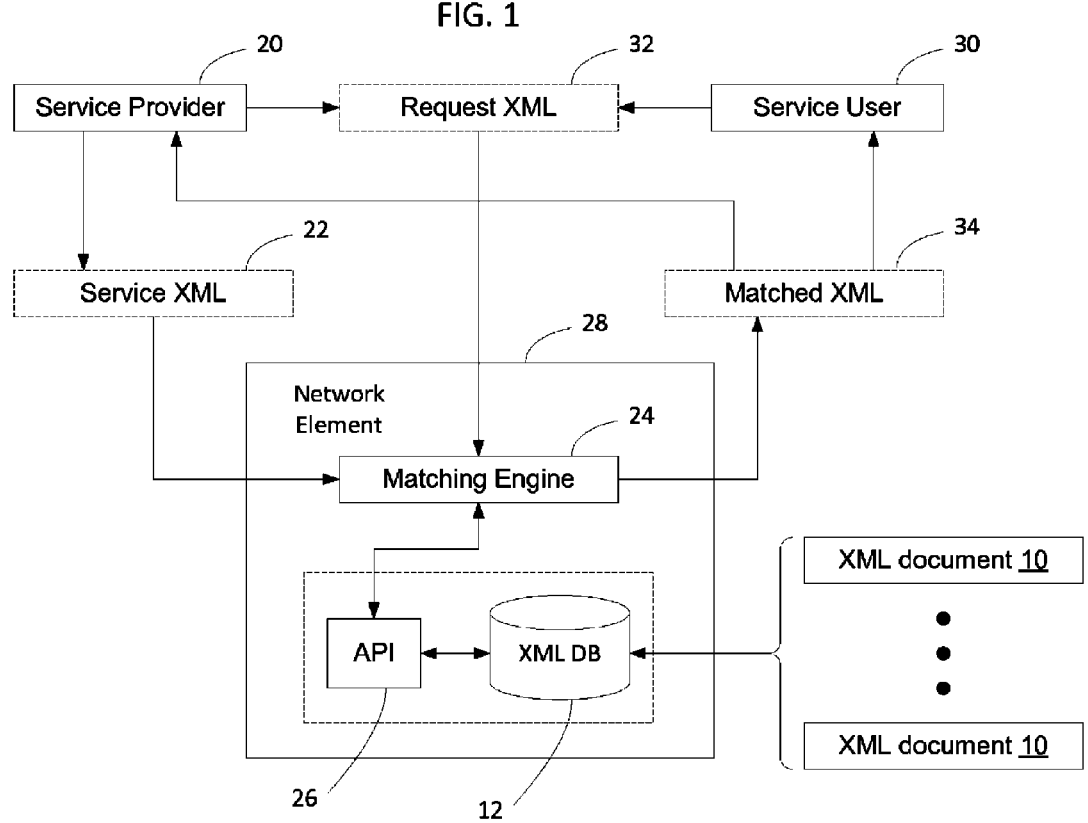

```
<?xml version= "1.0"?>
<service>
    <type>micro-location</type>
    <capability>
        <building name="south">
            <floor id="1">
                <room id="F102" status="off"/>
                <room id="F105" status="off"/>
            </floor>
        </building>
    </capability>
    <interfaces>
        <management>mgmt url</management>
        <execution>exec url</execution>
    </interfaces>
</service>
```

```
<?xml version= "1.0"?>
<service>
    <type>micro-location</type>
    <capability>
        <building name="south">
            <floor id="1">
                <room id="F102"/>
                <room id="F105"/>
            </floor>
        </building>
    </capability>
</service>
```

FIG. 7

| Pseudocode for GetRequestTree() function |
|---|
| 1.    QueryStr = "collection(container)" |
| 2.    $C_R$ = [] |
| 3.    While NextLevel == Yes: |
| 4.       NextLevel = No |
| 5.       pl = "/*" |
| 6.       QueryStr = QueryStr + pl |
| 7.       QueryResults = query with QueryStr |
| 8.       For qr in QueryResults: |
| 9.           $E_{iR}$ = [] |
| 10.          If it has a child: |
| 11.             NextLevel = Yes |
| 12.          Construct $E_{iR}$ using pl and qr |
| 13.          Append $E_{iR}$ to $C_R$ |
| 14.   Return $C_R$ |

FIG. 8

| Pseudocode for GetMatchDoc() function |
|---|
| 1.    $C_R$ = GetRequestTree(ReqDoc) |
| 2.    MatchDocList = [] |
| 3.    For i in NumDoc: |
| 4.       NumMatch = 0 |
| 5.       For $E_{iR}$ in $C_R$: |
| 6.          If GetMatchElement(Doc(i), $E_{iR}$) == True: |
| 7.             NumMatch += 1 |
| 8.       If NumMatch == $|C_R|$: |
| 9.          Append Doc(i) to MatchDocList |
| 10.   Return MatchDocList |

FIG. 9

| Pseudocode for GetMatchElement() function |
|---|
| 1.    QueryStr = string with predicates of $E_{iR}[0]$, $E_{iR}[1]$ and $E_{iR}[2]$ |
| 2.    QueryResults = query Doc(i) with QueryStr |
| 3.    If QueryResults.isNull(): |
| 4       Return False |
| 5.    Else: |
| 6.       Return True |

FIG. 10

```
Pseudocode for GetMatchDocEnhanced() function
1.   C_R = GetRequestTree(ReqDoc)
2.   MatchDocList = []
3.   For i in NumDoc:

4.       C_M = []
5.       For E_iR in C_R:
6.           E_iM = GetMatchElementEnhanced(Doc(i), E_iR)
7.           Append E_iM to C_M
8.       If |C_M| >= |C_R|:
9.           If IsWildcardRequest(C_R) == TRUE:
10.              C_EM = ReformCandidateTree(C_M, C_R)
11.              If |C_EM| not= 0:
12.                  Append Doc(i) to MatchDocList
13.          Else:
14.              Append Doc(i) to MatchDocList
15.  Return MatchDocList
```

FIG. 11

```
Pseudocode for GetMatchElementEnhanced() function
1.   QueryStr = "collection(container)" + E_iR[0]
2.   QueryResults = query with QueryStr
3.   E_iM = []
4.   For qr in QueryResults:
7.       Obtain (pn, pv), (pan, pav) and (nn, nv), (nan, nav)
8.       If (((pn, pv), (pan, pav) == E_iR[1]) and ((nn, nv), (nan, nav) == E_iR[2])) or
            (((pn, pv), (pan, pav) == E_iR[1]) and ((nn, nv), (nan, nav) == (*, *), (*, *)) or
            (((pn, pv), (pan, pav) == (*, *), (*, *) and ((nn, nv), (nan, nav) == E_iR[2])) or
            (((pn, pv), (pan, pav) == (*, *), (*, *) and ((nn, nv), (nan, nav) == (*, *), (*, *))):
9.           Construct E_iM with (pn, pv), (pan, pav) and (nn, nv), (nan, nav)
10.  Return E_iM
```

FIG. 12

```
Pseudocode for ReformCandidateTree() function
1.   L = GetWildcardPathLevel(C_R)
2.   NumL = GetLongestPath(C_R)
3.   NumN = GetWildcardMatchNodeNum(C_M, L)
4.   Reverse C_M
5.   C_EM = []
6.   For i in range(0, NumN):
7.       For E_iM in C_M:
8.           If |branch| == 0:
9.               If (|C_EM| == 0) or (E_iM does not belong to C_EM):
10.                  Insert E_iM to beginning of branch
11.              Else if E_iM is parent of E_(i-1)M
12.                  Insert E_iM to beginning of branch
13.          If |branch| == NumL:
14.              Append branch to C_EM
15.  Return C_EM
```

FIG. 13

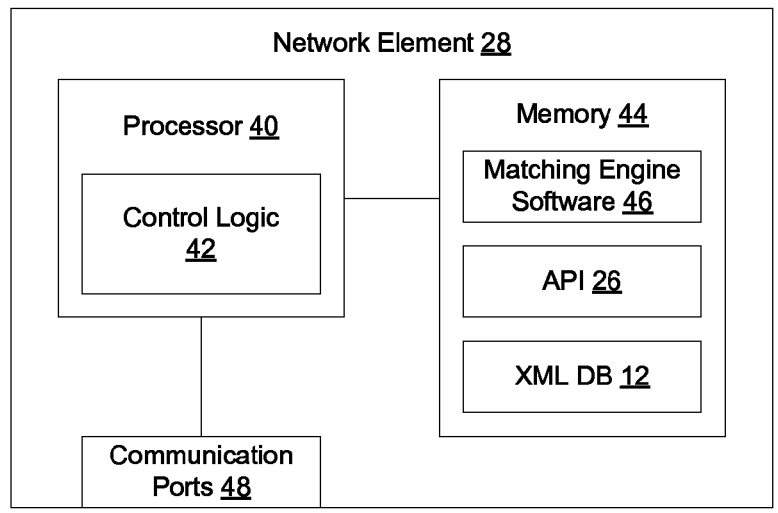

METHOD AND APPARATUS FOR DOCUMENT MATCHING

CROSS-REFERENCE TO RELATED APPLICATIONS

This application is a continuation of U.S. patent application Ser. No. 11/410,748, filed Apr. 25, 2006, the content of which is hereby incorporated herein by reference.

BACKGROUND

1. Field

This application relates to data searching and, more particularly, to a method and apparatus for document matching.

2. Description of the Related Art

Data communication networks may include various network elements, such as routers and switches, configured to facilitate the flow of data through the network. Networks may also include other network elements, such as computers and printers, configured to receive and transmit data over the network. Network elements may have different levels of intelligence, depending on the particular manner in which the network element is intended to operate on the network. For example, a network element may be relatively intelligent and configured to execute software to enable particular applications to be run on the network element, so that the network element can provide services on the network. Alternatively, the network element may be provided with less intelligence and configured to perform a particular service on the network. An example of a less intelligent network element may be a printer connected to the network and configured to provide print services on the network. Optionally, different network elements may work together to collectively provide services on the network.

As networks have developed, it has become possible to provide a greater variety of services on the networks. Network services are a class of services that are published, discovered, and executed, as well as operated and managed, all through the network. The services can be implemented as one or more network elements (for example, a printer to provide a printing service), as software running on the network elements (for example, a hotel reservation service), or as a combination of the two (using above examples, this may be a service to reserve a hotel and a service to print out the confirmation of the reservation).

To enable a service provider to provide network services, the service provider needs to have a way to operate and manage the services, and to have a way for consumers to discover and execute these services. Conventionally, a matching system has been used to match service offerings with customer requests. For example, a service provider may describe the available services and store the descriptions of service offerings in a database. At a later time, when a customer would like to obtain services or the service provider would like to change the service offerings, a request may be created and compared against service offerings in the database to locate the available service offerings. One common way to describe network services is to use a markup language such as XML (eXtensible Markup Language). An XML document may be used to represent network services, applications, and network elements. One reason for the increasing use of XML is because XML provides a flexible manner to describe the services, yet is able to maintain a hierarchical structure. If the service offerings have been described using XML, when a user would like to obtain network services, the user will need to generate an XML document (request) describing the desired services. The request will then be matched against available service offerings by comparing the XML request document against XML documents representing the available services which are stored in a database system. If a match is found, the service may be provided to the user.

Documents created using a markup language such as XML are defined not only by their content, but also by the way in which the document is configured. For example, the document may contain particular relationships between data elements. Thus, to find a matching document, the matching system must look not only for documents that have the same content, but also for documents that have the same structure. Stated another way, two XML documents may be considered to match each other only if they have the same data and the same structural relationships between the pieces of data contained in the document.

There are several technologies that have been developed to perform service matching, mainly in the area of service discovery. Several examples of such technologies include UPnP (Universal Plug and Play), SLP (Service Location Protocol), Konark, Jini, Salutation, Bluetooth SDP (Service Discovery Protocol), and UDDI (Universal Description, Discovery and Integration) that is defined in the service-oriented architecture (SOA). A summary of the matching techniques used in these technologies is shown in Table 1.

TABLE 1

| Technology | Target | Using XML to describe service | Keyword or attribute based matching approaches |
|---|---|---|---|
| UPnP | Network devices | Using XML to describe device features and capabilities | Using SDP, matching is based on 4 attributes<br>Service type URI, unique service name (USN) URI<br>Expiration and location |
| Konark | Wireless ad hoc devices and software services | Using XML to enable services to explain their characteristics | Matching is based on some attributes included in two messages<br>Service discovery message<br>Path or keyword, Port<br>Advertisement message<br>Service name, Path, Type, URL and TTL |
| Jini | Network devices Requires device to run Java or execute JVM | Not using XML | Lookup is based on<br>Service ID<br>Type<br>Attributes |

TABLE 1-continued

| Technology | Target | Using XML to describe service | Keyword or attribute based matching approaches |
|---|---|---|---|
| Bluetooth SDP | Specific to only Bluetooth devices | Not using XML | Searching by Service class Attributes Browsing |
| SLP | Solely for IP-based network | Not using XML | String-based querying for service attributes Query operator (AND/OR) is more powerful than Jini and UPnP which can be done only against equality |
| Salutation | Network devices | Not using XML | Capability exchanges Similar to Jini lookup |
| UDDI | SOA for web service | WSDL (using XML to describe web services) | Keyword-based searching, Version 3 extended to support single-step complex queries and wildcard queries |

As shown in Table 1, existing matching approaches generally do not handle XML, and those that do are generally based on key words or attributes rather than a document-based approach. Further, the services that are able to be described using these technologies are generally related to network devices rather than complex network services. Although these other technologies exist and some of them use XML to describe services, none of them uses document-based matching approach. Accordingly, it would be advantageous to provide a method and apparatus for document matching.

SUMMARY OF THE DISCLOSURE

A method and apparatus for document matching enables a matching engine to use not only the contents of a document but also to use its structure. According to an embodiment of the invention, a linear data structure is defined that includes not only the content of a node, but also the parent-child relationship of a node to its immediate parent node. This data structure will be referred to herein as a Path and Parent Associated Node (PPAN) element. A PPAN element includes three pieces of information about an XML element: (1) the current element; (2) the parent-child relationship of the current element; and (3) the path level of the current element.

When an XML document is received, it will be decomposed into a number of PPAN elements, which will be used to form PPAN chains. A PPAN chain is made of a number of PPAN elements. Since the XML document will be decomposed into PPAN elements, the XML document can be of any size. The PPAN matching process will then use the PPAN elements to perform a query and match simultaneously, for each node of the XML document.

The PPAN matching process is designed to enable complex services and applications, which are represented by generic XML documents, to be matched against XML requests so that the services may be provided on the network. Using the PPAN matching process, the service request XML document can include any service details, such as the service capability, properties and interfaces.

The PPAN matching process is designed based on the PPAN element, which makes the process scalable. Additionally, the PPAN matching process is able to perform matching operations at the time of querying to an XML element, which makes the process efficient. Finally, with some enhancement, the PPAN matching process is able to support matching for wildcard requests, which is a valuable feature to service users since the user does not need to know what services are available before submitting a request for a specific service.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIG. 1 is a functional block diagram of a network environment showing an example of a logical system for XML document matching according to an embodiment of the invention;

FIG. 2a is an example of a service XML document;

FIG. 2b is an example of a tree representation of the service XML document of FIG. 2a;

FIG. 3a is an example of a request XML document;

FIG. 3b is an example of a tree representation of the request XML document of FIG. 3a;

FIGS. 5a and 5b illustrate examples of wildcard requests, in which FIG. 5a shows an example of two branches that are contradicted, and FIG. 5b shows redundant branches;

FIGS. 6a and 6b illustrate examples of wildcard requests, in which FIG. 6a shows a branch with three levels and two wildcard nodes, and FIG. 6b shows a branch with three levels and one wildcard node;

FIGS. 7-9 illustrate pseudo-code configured to implement functions performed by an embodiment of the invention;

FIGS. 10-12 illustrate pseudo-code configured to implement functions performed by another embodiment of the invention in which wildcards are supported; and FIG. 13 is a functional block diagram of a network element configured to implement matching engine software according to an embodiment of the invention.

DETAILED DESCRIPTION

Figures 2A, 2B:
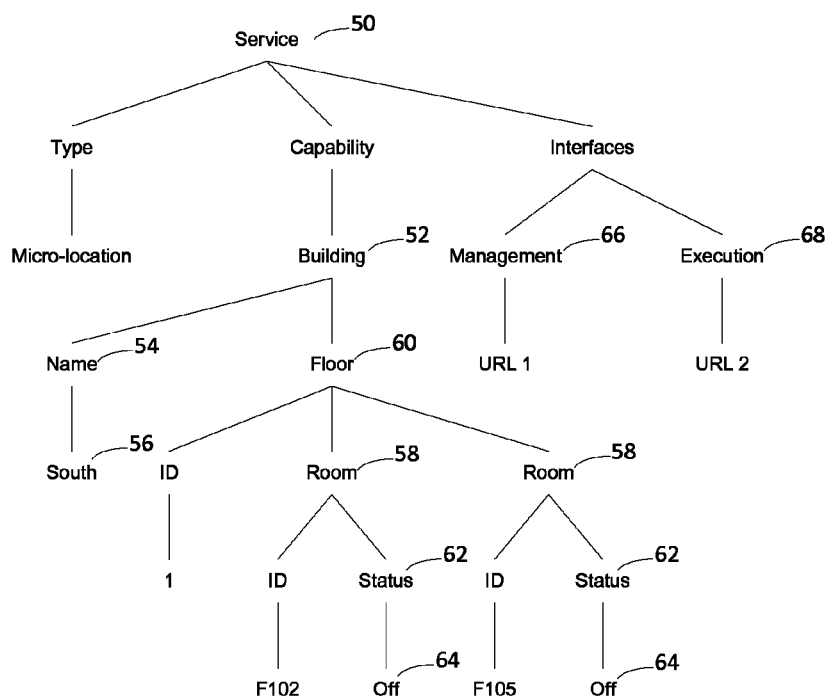

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

In the following description, an embodiment of the invention will be described in connection with an implementation that uses XML format documents to describe services. The invention is not limited to an embodiment that is configured to match XML format documents, however, as other structured document formats may be used. For example, Standard Generalized Markup Language (SGML) and other markup languages may be used to create documents to describe the services, and a matching engine may use the structure in those documents to perform matching operations as described in greater detail below. Accordingly, the invention is not limited to an embodiment that uses XML format, as other formats may be used as well.

XML document matching may occur by defining Path and Parent Associated Node (PPAN) elements, using the PPAN elements to form a PPAN chain, and then searching for XML documents that contain the same PPAN elements in the PPAN chain. A PPAN element, as used herein, is a linear data structure that includes not only the content but also the parent-child relationship of a node. A PPAN element therefore includes three pieces of information about an XML element: (1) the current element; (2) the parent-child relationship of the current element; and (3) the path level of the current element.

The PPAN matching process uses the parent-child structural relationship and the path level to perform XML searching for XML documents that contain not only the same data as the requested element, but also that have the data at the same place in the XML document. The structural information associated with the PPAN element also enables the PPAN matching process to support both query and match operations for one node at the same time.

One application that the PPAN matching process may be used for is in connection with providing access to complex services and applications that are represented by the generic XML documents. This allows the XML document to be formed using any schema, whether standardized or user-defined. Using the PPAN matching process, the service request XML document can include any service details, such as the service capability, properties and interfaces. This enables the XML document to be of any size. Since the PPAN matching process is designed based on the PPAN element, it is scalable. Additionally, since the PPAN matching process is able to perform match operations while querying to an XML element, the process is efficient. Further, as discussed in greater detail below, by providing minor enhancements, the basic PPAN matching process is able to support wildcard requests, which is a valuable feature to service users since the users may request services without knowing before-hand which particular services are available.

FIG. 1 illustrates an example of a logical system for XML document matching according to an embodiment of the invention. As shown in FIG. 1, services represented by XML documents 10 are stored in an XML database 12. The XML documents may be created by or on behalf of the service provider 20. As services are deployed on the network, or as the service offerings are changed, the XML documents representing those services may be created and updated as well. For example, as shown in FIG. 1, a service provider 20 may design a service offering and then describe the service offering in a service XML document 22. This service XML document 22 will be sent to a matching engine 24 that will access an API 26 to cause the XML document to be stored in the XML database 12.

To request a service, the service provider 20 or service user 30 will generate a request XML document 32 and send the request XML document to the matching engine 24. The matching engine interacts with the database 12 via API 26 to find matched services stored in the database, and returns matched XML document(s) 34 to the service provider and/or user.

The matching engine 24, API 26, and database 12, may be implemented as a network element such as a router or computer, as described in greater detail below in connection with FIG. 13. For example, where the XML matching is to be implemented as a network service, the XML matching process may be implemented as a processor in a network element. Alternatively, the XML matching process may be implemented on a general purpose computer connected to a network to be accessible to service providers 20 and users 30 via the network. The invention is not limited to the particular manner in which the matching service is implemented, instantiated, or connected to the network.

FIG. 2a shows an example of an XML document that may be used to describe a hypothetical service offering, and FIG. 2b shows a tree representation of the XML document of FIG. 2a. Each node in FIG. 2b corresponds to an element or attribute of the XML document shown in FIG. 2a. An edge represents a parent-child relationship between a node and another node, or between a node and its attribute.

In this example, it will be assumed that the XML document is designed to describe a micro-location service. Specifically, FIGS. 2a-2b show a micro-location service 50 that covers a building 52 with the name 54 south 56. Within the building, two rooms 58 on the first floor 60 are covered by the service. However, the status 62 of both rooms is specified as "off" 64. The management 66 and execution 68 interfaces are also given in this document.

Figures 3A, 3B:
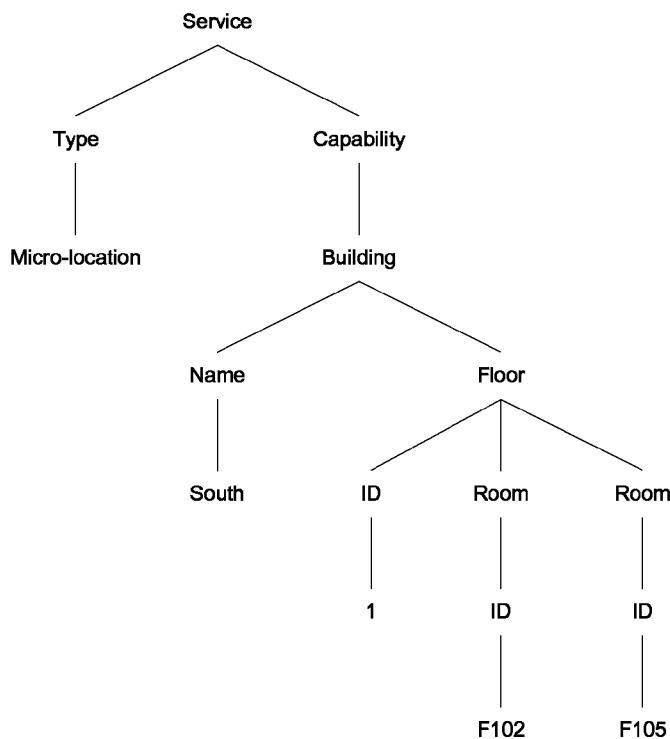

Assume that the service provider 20 wants to do the provisioning for rooms it covers. To do this, the service provider will enable the micro-location detection hardware for these rooms. This may involve some manual and on-site operation, for example to install the appropriate hardware in the rooms. After the hardware is enabled, the service provider will send a request XML document 32 to find out whether the micro-location service covers these two rooms or not. An example of a request document that may be used is shown in FIG. 3a, with associated tree representation shown in FIG. 3b.

If the request document matches an existing XML document, the service provider will set the status 62 for both rooms to "on". If a document describing the service doesn't exist, the service provider will create a new XML document 22 and register it into the database 12. Where it is necessary to create a new service, the registration document used by the service provider may be similar to the one shown in FIGS. 2a-2b, except that the status for the two rooms would be set to "on".

After the service provider has finished provisioning the micro-location service, the XML document shown in FIGS. 2a-2b may be updated to reflect the "on" status of two rooms. At this point, if a user requests a micro-location service that covers room F102 and F105 on the first floor in the south building, it can send a request similar to the one shown in FIGS. 3a-3b. After performing a matching operation, the matching engine will return the database document (i.e., FIG. 2a) to the user. The user may then extract interface information for further access. For example, the user may establish a user account for this service through the management interface, and may execute the service through the execution interface.

The database 12 may be implemented using a native-XML database (such as the Berkeley DB XML). The invention is not limited in this manner, however, as other relational or native-XML databases may be used as well. In this context, there are several indexing methods that have been proposed, however many of the indexing methods have not been implemented in commercial products. The relational approach can handle most (but not all) of the semantics of semi-structured queries over XML data, but is likely to be effective only in some cases. The advantage of using a native-XML database is that query execution is enhanced, because the native-XML database is specifically designed for storage and processing of XML data. Within the native-XML database, some efficient matching algorithms may be implemented for XML data matching. Numerous different XML database structures and searching technologies may be used to implement embodiments of the invention and the invention is not limited to the use of particular form of these technologies.

The Berkeley DB XML database software package provides APIs 26 that make use of the XQuery and XPath languages. XQuery and XPath are the standard XML querying languages for XML documents. These query languages allow queries to occur not only based on the contents of a document, but also based on the structure of the document. In addition, the Berkeley DB XML has the unique ability to store collections of data with schemas that vary from document to document if desired.

As used herein, the terms "element" and "node" will be used interchangeably to mean an element in an XML document or a node in the XML data tree. The following portions of the detailed description will describe the PPAN element, the PPAN chain, and the PPAN matching process and its implementation and performance, as well as enhancements that may enable the PPAN matching process to support wildcard requests.

PPAN elements are used to form a PPAN chain. The PPAN matching process makes use of the PPAN chain to match request documents with XML documents in the XML document database. In the following discussion, the following notations will be used:

$E_i$, $E_{iR}$ and $E_{iM}$: $E_i$ is used to define a PPAN element, where $i=0, 1 \ldots (N-1)$ and N (also $N_R$ and $N_M$) is the number of elements (Eq-1) that are included in an XML document. $E_{iR}$ and $E_{iM}$ are the variances of $E_i$. They represent the PPAN elements of the request and database documents, respectively.

$N_i$ and $P_i$ represent the current element and its parent element in an XML document, respectively. They are defined by (Eq-2) and (Eq-3), respectively.

C represents the PPAN chain that is made of a number of PPAN elements. C is given by (Eq-4) and may be implemented using a list.

$C_R$ represents a request XML tree. It is defined by (Eq-6) as a PPAN chain and obtained from the request XML document. $C_R$ will be used in the PPAN matching process as an input tree for the process to find matches against it.

$C_M$ and $C_{EM}$: $C_M$ represents the candidate matched tree. $C_M$ is defined by (Eq-7) and obtained from a database XML document after the query and match operations are done. $C_{EM}$ is the modified candidate matched tree. $C_M$ and $C_{EM}$ are only required when a request document is specified using one or more wildcards. With no wildcard requests, neither $C_M$ nor $C_{EM}$ need to be stored during the matching process, which saves storage space during the matching process.

A PPAN element is a data structure that includes information associated with the current node, the parent-child relationship of the current node, and the level of the current node in the XML data tree. The definition of the PPAN element ($E_i$) is given by (Eq-1):

$$E_i = \{pl_i, P_i, N_i\} = i0, 1 \ldots (N-1) \qquad (Eq-1)$$

In (Eq-1), $E_i$ is the PPAN element of a node (N) in the XML data tree. It includes three sub list elements: $pl_i(E_i[0])$ specifies the query path level of the current node in the XML data tree; $N_i(E_i[2])$ includes information of the current node; and $P_i(E_i[1])$ includes information of the parent node of $N_i$.

The sub-list elements that are defined for the current node and its parent node are given by (Eq-2) and (Eq-3), respectively, where $\{nn_i, nv_i\}$ and $\{pn_i, pv_i\}$ represent the name and value pairs of the current element and its parent element, while $\{nan_j, nav_j\}$ and $\{pan_k, pav_k\}$ represent their attribute name and value pairs. Assume that the number of attributes of the node and its parent is l and m, respectively. Note that for the root node, its parent is represented by an empty list.

$$N_i = E_i[2] = \{\{nn_i, nv_i\}, \{nan_j, nav_j\}: j=0, 1 \ldots (l-1)\}, \\ i=0, 1 \ldots (N-1) \qquad (Eq-2)$$

$$P_i = E_i[1] = \{\{pn_i, pv_i\}, \{pan_k, pav_k\}: k=0, 1 \ldots (m-1)\}, \\ i=0, 1 \ldots (N-1) \qquad (Eq-3)$$

Figure 4:
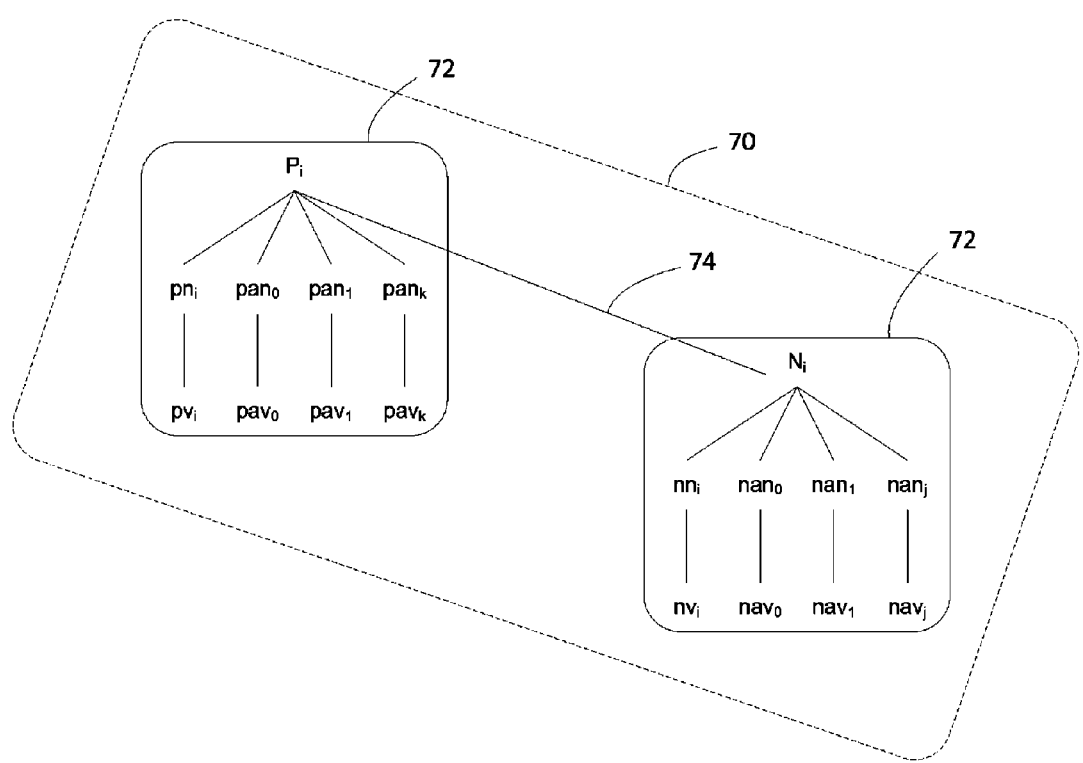
FIG. 4 is a logical diagram of a PPAN element according to an embodiment of the invention.

FIG. 4 illustrates the information represented by a PPAN element 70. As shown in FIG. 4, the PPAN element 70 includes two nodes 72 connected with a parent-child relationship 74. As can be observed from (Eq-1) and FIG. 4, a PPAN element is a linear data structure that includes not only the content, but also the parent-child relationship 74 of a node. A PPAN element thus provides three pieces of information about a node: (1) the current node indicated by $N_i$, i.e., $\{nn_i, nv_i\}$ and $\{nan_j, nav_j\}$ (2) the parent-child relationship of the current node represented by $P_i$ and $N_i$, i.e., $\{pn_i, pv_i\}$ and $\{pan_k, pav_k\}$ as well as $\{nn_i, nv_i\}$ and $\{nan_j, nav_j\}$; and (3) the path level of the current node ($pl_i$). The combination of the three pieces of information enables the PPAN matching process to support query and match for one node at the same time. Note that using the tree terminology, the combination of $P_i$ and $N_i$ represents the edge between the node $N_i$ its parent node $P_i$.

The PPAN element may occur at several different levels of the document. For example, the parent node P may be the root node, in which case P has no higher level node and the N node may be a leaf node, in which case N has no lower level nodes. Alternatively, one or more of P and N may be intermediate (i.e., neither root nor leaf) nodes. Thus, the PPAN element may be used to represent any parent-child relationship within an XML document.

In the PPAN matching process, the PPAN chain (C) will be used to represent an XML document. A PPAN chain is made up of a number of PPAN elements. The PPAN chain is defined in (Eq-4) and (Eq-5).

$$C = \{E_i: i=0, 1 \ldots (N-1)\} \qquad (Eq-4)$$

$$|C| = N \qquad (Eq-5)$$

Table 2 shows the PPAN chain of the example request XML document shown in FIG. 3. The chain includes a list of PPAN elements, and each element in the chain includes three pieces of information as defined in (Eq-1), (Eq-2) and (Eq-3). The first PPAN element represents the root node in the tree. Therefore, it does not have a parent node associated with it, and the sub element of the parent is an empty list.

TABLE 2

```
C_R = [
['/*', [ ], ['service']],
['/*/*', ['service'], ['type', 'micro-location']],
['/*/*', ['service'], ['capability']],
['/*/*/*', ['capability'], ['building', ['name', 'south']]],
['/*/*/*/*', ['building', ['name', 'south']], ['floor', ['id', '1']]],
['/*/*/*/*/*', ['floor', ['id', '1']], ['room', ['id', 'F102']]],
['/*/*/*/*/*', ['floor', ['id', '1']], ['room', ['id', 'F105']]]
]
```

Once a PPAN element has been defined, and a PPAN chain is able to be defined, it is possible to perform a search for documents that have the structure and values associated with the PPAN elements in the PPAN chain. The PPAN matching process, described below, provides one way in which this may occur according to an embodiment of the invention. The invention is not limited to this particular process, however, as other processes may be used as well. As described in greater detail below, using the PPAN matching process, matching may be performed at the time of querying to an XML element, which thereby enables both query and match to occur at the same time.

The PPAN matching process includes two major steps. The first step is to derive the request tree ($C_R$) from a request document. The matching engine will use the request tree $C_R$ as an input to find database documents that match the input request tree $C_R$. The second step performs query and match operations based on the request tree ($C_R$). In the second step, the candidate matched tree ($C_M$) is only required when the request is specified with the wildcard. As discussed in greater detail below, by enabling the match to be done at the time of querying, due to the use of the PPAN element, the computational time and space complexity may be reduced significantly.

The request tree ($C_R$) obtained from the request document and candidate matched tree ($C_M$) found in a database document can be described by (Eq-6) and (Eq-7), respectively, where $E_{iR}$ and $E_{iM}$ are PPAN elements defined in (Eq-1), and they are obtained by querying from the request and database documents, respectively, and assuming that $C_R$ and $C_M$ include $N_R$ and $N_M$ PPAN elements, respectively.

$$C_R = \{E_{iR} : i=0, 1 \ldots (N_R-1)\} \quad (\text{Eq-6})$$

$$C_M = \{E_{iM} : i=0, 1 \ldots (N_M-1)\} \quad (\text{Eq-7})$$

If the XML documents follow the W3C XML recommendation, an attribute name in the same start-tag or empty-element tag must be unique. When using the PPAN notation, this means that every PPAN element ($E_{iR}$ or $E_{iM}$) included in the PPAN chain ($C_R$ or $C_M$) is unique. This property can be described by (Eq-8).

$$E_p \neq E_q, \text{ when } p \neq q \text{ and } p, q=0, 1 \ldots (N-1), N \text{ is } N_R \text{ or } N_M \text{ for } C_R \text{ or } C_M, \text{ respectively} \quad (\text{Eq-8})$$

Given (Eq-6), (Eq-7) and (Eq-8), if both (Eq-9) and (Eq-10) below are held, the current database document matches the request document when all these conditions are met, and that causes (Eq-11) to be true. Eq-11 represents the mathematic condition that $C_M$ matches $C_R$.

$$E_{iM} \in C_R \text{ for all } i, i=0, 1 \ldots (N_R-1) \quad (\text{Eq-9})$$

$$|C_M| \geq |C_R| \quad (\text{Eq-10})$$

$$C_R \in C_M \quad (\text{Eq-11})$$

In these equations, (Eq-9) indicates that $N_R$ of $N_M$ nodes, and their relationships in the candidate matched tree $C_M$, are also found in the request tree $C_R$. (Eq-10) states that the size of the candidate matched tree $C_M$ is greater than or equal to the size of the request tree $C_R$. In (Eq-10), $|C_M|=|C_R|$ is sufficient for the $C_M$ to match the $C_R$ as long as the request is specific (i.e., does not use any wildcards). When wildcards are used, the size of the candidate matched tree may be greater than the size of the request tree: $|C_M|>|C_R|$. Details about the enhanced PPAN matching process to support wildcard requests will be discussed in greater detail below.

In the PPAN matching process, there are three possible matching scenarios. The first scenario occurs if the elements and their relationships included in a database document are exactly the same as those specified in the request document. That is (Eq-12), (Eq-13) and (Eq-14) below are all held. In this case, $N=N_R=N_M$.

$$E_{iM}=E_{iR} \text{ for all } i, i=0, 1 \ldots (N-1) \quad (\text{Eq-12})$$

$$C_M=C_R \quad (\text{Eq-13})$$

$$|C_M|=|C_R| \quad (\text{Eq-14})$$

In the second scenario, the elements and their parent-child relationships match those in the request document. However some sub-trees in the database document may be ordered differently, as compared with those in the request document. In the third scenario, the database document includes elements in addition to those requested in the request document. The second and third scenarios are addressed by (Eq-9)-(Eq-11).

To understand more fully how these equations may be implemented to enable document matching to occur using the PPAN elements described above, additional details will be provided to describe an example implementation of the PPAN matching process. The invention is not limited in this manner as other implementations may be used as well.

In the described example, the PPAN matching process includes two major functions: GetRequestTree( ) to get the request tree ($C_R$), and GetMatchDoc( ) to perform the query and match in the XML database.

To take advantage of the Berkeley DB XML, when the matching engine receives a request document, it first stores the request document into the database 12 as a temporary document; then accesses this temporary document by using the APIs 26 provided by the Berkeley DB XML to construct the request tree ($C_R$). The temporary document is dynamically refreshed every time that the matching engine receives a request. FIG. 7 shows the pseudo-code of the GetRequestTree( ) function. The return of the function is the request tree ($C_R$), which is obtained from the request XML document (Line 14). The PPAN matching process is designed to be able to find all nodes that are required for matching at all nested levels. It can be observed that the space complexity of the GetRequestTree( ) function is O(|$C_R$|)=O(N), assuming the request document includes N elements.

FIG. 7 illustrates an example of pseudo-code that may be used to implement the GetRequestTree( ) function. In this pseudo-code, the "container" defined in the query string is equivalent to a database folder that holds a collection of XML documents (Line 1). The main body of the function is the loop (Line 3~Line 13). The loop ensures that all elements on all levels in the request document are scanned. Within the loop, after some necessary setup, the query on the current level is performed. For each query result, a PPAN element ($E_{iR}$) for the current node is constructed (Line 12) and appended to the request tree ($C_R$). The final step (Line 14) comes if there are no more nested nodes left. This step returns the request tree ($C_R$), i.e., a list that holds a number of PPAN elements ($E_{iR}$).

FIG. 8 illustrates an example of pseudo-code that may be used to implement the GetMatchDoc( ) function. Assume that the request document does not include any element or attribute that is specified with the wildcard. As shown in FIG. 8, the GetMatchDoc( ) function is called when the matching engine receives a request document. The first step is to get the request tree ($C_R$) (Line 1). The matching operation is then done document by document (Line 3~Line 9). For each database document, if the PPAN element of the current database document ($E_{iM}$) satisfies the one requested in the request document ($E_{iR}$), the size of the candidate matched tree ($C_M$) is incremented. Note that the process does not actually keep the candidate matched tree (Line 7). If all requested PPAN elements are satisfied (Line 8) the current document is added to the return list (Line 9). The final step (Line 10) returns all database documents that match the request document.

FIG. 9 illustrates an example of pseudo-code that may be used to implement the GetMatchElement( ) function, called at Line 6 of the GetMatchDoc( ) function (FIG. 8). As shown in FIG. 9, the query string is specified with predicates, which are sub list elements of the input PPAN element ($E_{iR}$). If the query result is not null, a match is found; otherwise, no match is found.

(Eq-15) gives an example of a query string with two predicates. The query string at Line 1 in FIG. 9 is similar to this example; except that the predicates are decided by an input PPAN element ($E_{iR}$).

$$\text{collection('container')/service[type='micro-location']/capability/building[@name='south']} \quad \text{(Eq-15)}$$

One advantage of using the PPAN element is that the matching operation can be performed at the time of querying to a node and on the set basis. This is possible, because the PPAN element includes sufficient information for both the match and query operations to occur at the same time.

In the following sub-section, the performance of the PPAN matching process will be evaluated by using asymptotic analysis to provide an estimation of running time of the PPAN matching process.

Assume that N is the number of nodes that are included in the request document; L is the number of path levels in the request document; and M is the average number of nodes per path level excluding the root node in the request document. It will also be assumed that (Eq-16), (Eq-17) and (Eq-18) are true for the request document. (Eq-16) and (Eq-17) imply that the request document includes at least one node in addition to the root node.

$$N \geq 2 \quad \text{(Eq-16)}$$

$$2 \leq L \leq N, \text{ i.e., } 1/(L-1) \leq 1 \quad \text{(Eq-17)}$$

$$M = (N-1)/(L-1) \quad \text{(Eq-18)}$$

Similarly, assume that for a database document, $N_d$, $L_d$ and $M_d$ are the number of nodes, the number of path levels and the average number of nodes per path level excluding the root node, respectively. It will also be assumed that (Eq-19), (Eq-20) and (Eq-21) are true for a database document.

$$N_d \geq 2 \quad \text{(Eq-19)}$$

$$2 \leq L_d \leq N_d, \text{ i.e., } 1/(L_d-1) \leq 1 \quad \text{(Eq-20)}$$

$$M_d = (N_d-1)/(L_d-1) \quad \text{(Eq-21)}$$

According to (Eq-11), there are three pre-conditions for a match to be found: (1) the size of the database document should be at least equal to the size of the request document; (2) the number of path levels of the database document should be at least equal to the number of path levels of the request document; and (3) the number of nodes at each level of the database document should be at least equal to the number of nodes at associated level of the request document. The first two conditions can be represented by (Eq-22) and (Eq-23).

$$N_d \geq N \quad \text{(Eq-22)}$$

$$L_d \geq L \quad \text{(Eq-23)}$$

Assume that the time for accessing one node in one document within the database is one unit, i.e., O(1), the query time on one path level is given by (Eq-24) and (Eq-25), where (Eq-24) defines the query time for the root node ($t_{root}$), and (Eq-25) is the query time for a node on a path level that is nested under the root node (t). Note that (Eq-25) is defined based on (Eq-21) and an assumption that within the database, the search (or scan) is required for query to a node on a path level nested under the root node.

$$t_{root} = 1 \quad \text{(Eq-24)}$$

$$t \leq M_d \quad \text{(Eq-25)}$$

According to (Eq-24) and (Eq-25), the query time for M nodes on a path level nested under the root node ($t_p$) is given by (Eq-26) and the query time for all N nodes, T(N), is given by (Eq-27).

$$t_p = M \times t \leq M \times M_d \quad \text{(Eq-26)}$$

$$T(N) = t_{root} + (L-1) \times t_p \leq 1 + (L-1) \times M \times M_d \quad \text{(Eq-27)}$$

Using (Eq-18) and (Eq-21), (Eq-28) can be derived from (Eq-27).

$$T(N) \leq 1 + (L-1) \times ((N-1)/(L-1)) \times ((N_d-1)/(L_d-1)) = 1 + (N-1) \times (N_d-1)/(L_d-1) \quad \text{(Eq-28)}$$

Then (Eq-29) can be derived from (Eq-28) if (Eq-20) is considered.

$$T(N) \leq 1 + (N-1) \times (N_d-1) \quad \text{(Eq-29)}$$

Furthermore, according to (Eq-22), assuming $N_d = aN+b$, where a ($\geq 1$) and b ($\geq 0$) are constants, (Eq-29) can be replaced with (Eq-30). (Eq-30) means T(N) is in $O(N^2)$, which is given by (Eq-31).

$$T(N) \leq 1 + (N-1) \times (aN+b-1) \quad \text{(Eq-30)}$$

$$T(N) = O(N^2) \quad \text{(Eq-31)}$$

Note that in (Eq-30), if a=1 and b=0, when $N \geq 1$, $T(N) \leq N^2$. This is an example to show that (Eq-31) holds. The detailed proof for (Eq-31) has not been shown to avoid obfuscation of the invention.

Based on above asymptotic analysis, the running time of the PPAN matching process is in $O(N^2)$ (Eq-31), assuming the request document has N elements. Note that this time, T(N), represents the total processing time required to find a matched document. It includes the time spent at the matching engine by the PPAN matching process and the time spent within the database. In other words, if a scan is not needed on each path level within the database, (Eq-25) will become t=1. Therefore, the running time of the PPAN matching process is $O(N^2)$ since, as mentioned above, it has been assumed the scan was needed within the database to find a node on a path level. Accordingly, the running time required to implement a matching process is controlled by the number of nodes of the request document, rather than the complexity of the documents in the database.

As described above, the PPAN matching process has been designed to work with a PPAN chain, which is formed from a number of PPAN elements. A PPAN element is a linear data structure that includes not only the content, but also the parent-child relationship of a node. This structure provides the PPAN matching process with scalability as well as performance efficiency.

The PPAN matching process is able to support matching for the complex services that are represented by generic XML documents, with match operations being performed on the basis of the entire document. Thus, the PPAN matching process may be used to locate complex services described using generic XML documents.

The PPAN matching process is also relatively fast. For example, given a request, if the three conditions (two of them are in connection with Eq-22 and Eq-23) discussed above are all held for a database document, a match maybe found. In this case, the time it takes to perform a match using the PPAN matching process is on the order of $N^2$, as can be observed from (Eq-31), where N is the number of elements in the request document and Eq-25 is assumed to be true. Additionally, the PPAN matching process running time is proportional to the path levels requested in the request document (L). This can be observed at Lines 5 and 8 of the GetMatchDoc( ) function shown in FIG. 8, as well as Line 1 of the GetMatchElement( ) function shown in FIG. 9. At Line 5 of FIG. 8, a loop is defined with the request tree ($C_R$). This means that the query process only goes to L levels requested in the request tree ($C_R$). In other words, the query process for a database document does not have to go through all path levels ($L_d$). Note that the condition for a match to be found is $L \leq L_d$ as given in (Eq-23).

The PPAN matching process does not generate intermediate results during the matching operation, because the matching process is done at the time of querying. This can be observed at Line 7 of the GetMatchDoc( ) function in FIG. 8. For the specific (not wildcard) service request, the PPAN matching process only requires one list to hold the service request tree as an input list. Line 8 in FIG. 8 defines a condition to check if the entire request tree ($C_R$) is satisfied. The condition is very simple—it checks to determine if the number of PPAN elements found in the database document is the same as the size of the request tree $C_R$. Accordingly, the space complexity of the GetMatchDoc( ) function is on the order of $O(|C_R|)=O(N)$.

Finally, as described below, with some enhancement on the post-processing stage, the PPAN matching process is able to support matching for the wildcard request. This is especially valuable to service consumers since they do not need to know what services are provided before submitting a request for specific services. To enable wildcards to be supported, the pseudo-code shown in FIGS. 7-9 needs to be modified slightly, for example as shown in FIGS. 10-12.

As used herein, the use of the phrase wildcard request will be used to refer to a wildcard request for elements of the XML document that are used to describe the service features, properties and so on. For example, in FIG. 2, the capability element and its nested elements could be used for this purpose. Theoretically, a request can be specified with any combination of a number of wildcards. This means that the number of sets of wildcard request options can be unlimited. However, in reality, some combinations may not be necessary, while some may not be logical or may be contradictory.

Figure 5A:
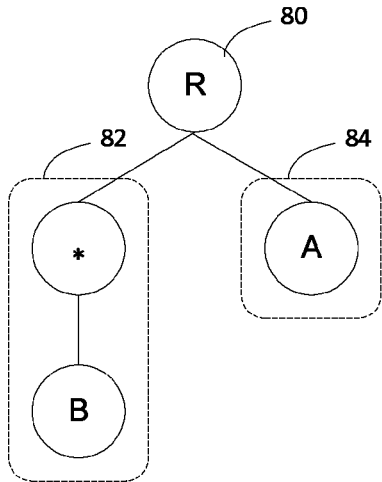
Figure 5B:
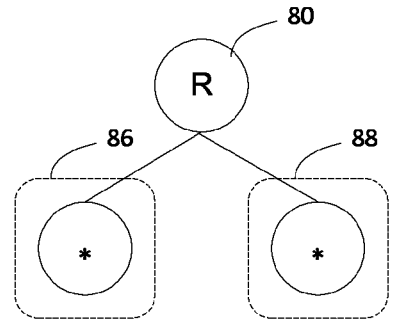

FIGS. 5a and 5b give two examples of wildcard requests that are either contradictory (FIG. 5a) or redundant (FIG. 5b). Note that the R node in FIGS. 5a and 5b represents the root node (80). In FIG. 5a, branch 1 (82) would be interpreted as a request for any node on the level nested into the root node (*) as long as it also covers another specific element (B) or attributes (not shown) on its nested level. Branch 2 (84), by contrast, would be interpreted as a request of a specific element (A) on the level nested into the root node. Therefore, these requests on the two branches are contradictory. In FIG. 5b, the two branches (86, 88) specify the same information and, therefore, are redundant.

Figure 6A:
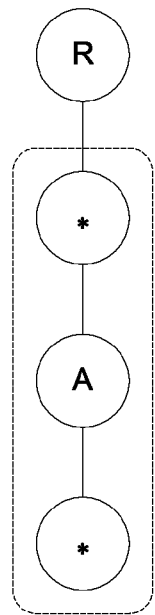
Figure 6B:
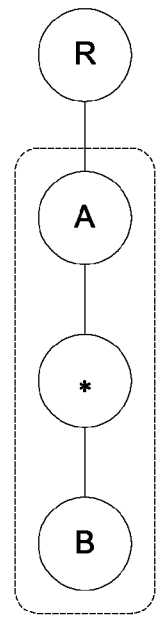

To avoid confusion, it is recommended that wildcard requests of the type shown in FIGS. 6a and 6b be used, in which the wildcard request occurs on one branch only. Within the branch, any number of path levels with any combination of nodes is allowed. In the enhanced PPAN matching process, there is a built-in condition (Line 2 and 13 in FIG. 12) to check if the request is specified to have the recommended format as in FIG. 6. If the request is formed like the one shown in FIG. 5a, the process will automatically take the branch that has a longer path (Branch 1 in FIG. 5a) and will discard the other branch. Other default options may be used as well and the invention is not limited to an embodiment that takes the longer path by default.

When wildcard requests are allowed to be used, it is possible for the size of the candidate matched tree to be greater than the size of the request tree (Eq-10), i.e., $|C_M|>|C_R|$. In this case, the original process shown in FIG. 8 may not work properly because the $C_M$ may include incomplete branches that make the size of two trees the same. In order for PPAN matching process to handle a wildcard request properly, one more condition needs to be held, as given by (Eq-32). In (Eq-32), $C_{EM}$ is a new candidate matched tree modified from the original candidate matched tree ($C_M$). When (Eq-32) is satisfied, at least one complete branch is found in the candidate matched tree $C_M$; otherwise, there is no match.

$$|C_{EM}| \neq 0 \tag{Eq-32}$$

To obtain the modified candidate matched tree $C_{EM}$, a new function, ReformCandidateTree( ) is introduced. In addition, other two functions, GetMatchDoc( ) (FIG. 8) and GetMatchElement( ) (FIG. 9), need to be modified to support the wildcard feature.

FIG. 10 shows one example of pseudo-code designed to perform the GetMatchDocEnhanced( ) function. It is modified from the original GetMatchDoc( ) function shown in FIG. 8 to enable the function to support wildcards. The modified portions are set forth in Lines 6-13. The function shown in FIG. 10 supports matching for both specific and wildcard requests.

One of the changes in the pseudo-code shown in FIG. 10, as compared to the pseudo-code shown in FIG. 8, is that the enhanced function requires creating the candidate matched tree ($C_M$). The enhancement is done on the post-processing of the candidate matched tree ($C_M$) (Line 10), which removes all of the incomplete branches in the candidate matched tree ($C_M$). As a result, the reformed candidate matched tree ($C_{EM}$) should include at least one complete branch. Otherwise, there is no match. Note that the enhanced function requires creating a list in order to hold the candidate matched tree ($C_M$) (Line 6 and 7). As will be discussed below, the processes for query and match (Line 6) are also enhanced to support wildcard matching. In addition, in the enhanced function, the condition to check if the entire candidate matched tree ($C_M$) matches the request tree ($C_R$) is now to compare the size of the two trees (Line 8).

The pseudo-code of the enhanced function for query and match, GetMatchElementEnhanced( ), is shown in FIG. 11. The enhancement is done at three major steps as shown in Lines 1, 7 and 8 of the pseudo-code. Note that steps listed in this pseudo-code are on the abstract level.

At Line 1, the query string is specified only with the path level to allow the match for the wildcard (Line 8). Line 7 utilizes the APIs to obtain information required for the PPAN element matching operation. Information of the PPAN element is then used for the matching operation (Line 8).

In terms of performance, one feature is worth highlighting. During the matching operation, only the matched PPAN element is kept. This can be observed at Lines 8 and 9. This is the step that enables the computational space complexity to be bounded by the number of matched nodes in the database document.

FIG. 12 shows pseudo-code that may be used to implement the function, ReformCandidateTree( ) for post-processing of the candidate matched tree $C_M$. In the beginning of this function, the longest request path (Line 2) in the request tree ($C_R$) is obtained. This is determined according to the maximum number of the path levels among all branches in the $C_R$. This value will be used at Line 13 to check if a branch is a complete one. The loop (Lines 7 to 12) is created to find a branch that is made of a number of the $E_{iM}$ elements, including those that match the wildcard. At Lines 13 and 14, the length of a branch is checked. These two steps ensure that all incomplete branches are removed.

FIG. 13 illustrates an embodiment of a network element 28 configured to implement the matching engine according to an embodiment of the invention. The network element may be a router or switch configured to facilitate the transportation of data on a network or may be a computer or other processing device configured to be connected to the network. The invention is not limited to the particular processing platform chosen to implement the matching engine.

As shown in FIG. 13, the network element includes a processor 40 having control logic 42 configured to implement the functions ascribed to the matching engine 24 described above. Specifically, the network element includes a memory 44 containing matching engine software 46 stored therein and configured to be loaded into the processor 40 to cause the control logic to execute the process steps contained in the software 46. The memory may also include other software, such as software implementing the APIs 26 and the database 12, although one or more of these components may be interfaced to the network element or contained in a different memory structure. The network element may also include other conventional aspects, such as communication ports 48 to enable it to communicate with other network elements on the network. Thus, the invention is not limited to this particular illustrated embodiment as many different configurations may be used to implement network elements configured to implement embodiments of the invention.

It should be understood that all functional statements made herein describing the functions to be performed by the methods of the invention may be performed by software programs implemented utilizing subroutines and other programming techniques known to those of ordinary skill in the art. Alternatively, the functions may be implemented in hardware, firmware, or a combination of hardware, software, and firmware. The invention is thus not limited to a particular implementation.

The control logic 42, may be implemented as a set of program instructions that are stored in a computer readable memory within the network element and executed on a microprocessor, such as processor 40. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing services in a network, the method comprising:
   storing structured service documents defining available services in a database in at least one network element;
   receiving a service request in the at least one network element from a service requestor, the service request comprising a structured request document, the structured request document containing a plurality of nodes;
   forming a Path and Parent Associated Node (PPAN) element for each node in the structured request document, each PPAN element being a data structure containing a path level of a current node in the structured request document, a name and value pair associated with the current element, and a name and value pair of a parent element of the current element, the PPAN element not containing additional information about structure of the structured request document other than the path level of the current node and the parent-child relationship of the current node and its parent node;
   using the PPAN elements from the structured request document to identify a subset of the stored structured service documents that contain data and structure that match the PPAN elements; and
   providing to the service requestor, at least part of an structured service document in the identified subset of structured service documents to enable the service requestor to access the service defined by the structured service document of which at least part was provided.

2. The method of claim 1, comprising the service requestor accessing the service defined by the structured service document of which at least part was provided using information in the provided at least part of the structured service document.

3. The method of claim 1, wherein each PPAN element comprises attribute name and value pairs associated with the current node.

4. The method of claim 3, wherein a current attribute value of at least one of the PPAN elements is a wildcard.

5. The method of claim 3, wherein a current attribute name of at least one of the PPAN elements is a wildcard.

6. The method of claim 1, wherein each PPAN element comprises attribute name and value pairs associated with the parent node.

7. The method of claim 6, wherein a current attribute value of at least one of the PPAN elements is a wildcard.

8. The method of claim 6, wherein a current attribute name of at least one of the PPAN elements is a wildcard.

9. The method of claim 1, comprising forming a PPAN chain from the PPAN elements.

10. The method of claim 9, wherein using the PPAN elements from the structured request document to identify a subset of the stored structured service documents that contain data and structure that match the PPAN elements comprises using the PPAN chain to search for a subset of structured service documents that contains the PPAN chain.

11. The method of claim 1, wherein:
   the structured service documents are created using a structured language; and the structured request document is created using the same structured language.

12. The method of claim 11, wherein the structured language is XML.

13. The method of claim 11, wherein the structured language is SGML.

14. The method of claim 1, wherein the structured request document has a tree structure comprising a root node and a plurality of subservient nodes at levels different from the root node, and wherein the path level of the current node describes a level of the current node in the tree structure.

15. The method of claim 1, wherein the structured service documents are XML service documents.

16. The method of claim 1, wherein the structured service documents are SGML service documents.

17. The method of claim 1, wherein the structured request document is an XML request document.

18. The method of claim 1, wherein the structured request document is a SGML request document.

* * * * *